(12) United States Patent
Nakanishi et al.

(10) Patent No.: US 8,932,773 B2
(45) Date of Patent: Jan. 13, 2015

(54) HYDROGEN GENERATING APPARATUS AND HYDROGEN GENERATING METHOD

(75) Inventors: Haruyuki Nakanishi, Susono (JP);
Hidekazu Arikawa, Susono (JP);
Susumu Hikazudani, Osaka (JP);
Chikashi Inazumi, Osaka (JP); Sadao Araki, Osaka (JP); Takuma Mori, Osaka (JP)

(73) Assignees: Toyota Jidosha Kabushiki Kaisha, Toyota (JP); Hitachi Zosen Corporation, Osaka (JP)

( * ) Notice: Subject to any disclaimer, the term of this patent is extended or adjusted under 35 U.S.C. 154(b) by 742 days.

(21) Appl. No.: 13/255,381

(22) PCT Filed: Mar. 11, 2010

(86) PCT No.: PCT/JP2010/054614
§ 371 (c)(1),
(2), (4) Date: Nov. 1, 2011

(87) PCT Pub. No.: WO2010/116874
PCT Pub. Date: Oct. 14, 2010

(65) Prior Publication Data
US 2012/0040261 A1    Feb. 16, 2012

(30) Foreign Application Priority Data
Apr. 7, 2009   (JP) .................................. 2009-093167

(51) Int. Cl.
| | | |
|---|---|---|
| H01M 8/06 | (2006.01) |
| C01B 3/04 | (2006.01) |
| B01J 8/02 | (2006.01) |
| B01J 8/04 | (2006.01) |
| B01J 21/04 | (2006.01) |
| B01J 23/42 | (2006.01) |
| B01J 23/44 | (2006.01) |
| B01J 23/46 | (2006.01) |
| B01J 23/745 | (2006.01) |
| B01J 23/755 | (2006.01) |
| B01J 35/02 | (2006.01) |

(52) U.S. Cl.
CPC ............... *C01B 3/047* (2013.01); *B01J 8/0221* (2013.01); *B01J 8/0438* (2013.01); *B01J 21/04* (2013.01);*B01J 23/42* (2013.01); *B01J 23/44* (2013.01); *B01J 23/462* (2013.01); *B01J 23/745* (2013.01); *B01J 23/755* (2013.01); *B01J 35/023* (2013.01); *B01J 2208/00061* (2013.01); *B01J 2208/00274* (2013.01); *B01J 2208/025* (2013.01); *C01B 2203/06* (2013.01); *C01B 2203/066* (2013.01); *C01B 2203/1041* (2013.01); *C01B 2203/1047* (2013.01); *C01B 2203/1052* (2013.01); *C01B 2203/1058* (2013.01); *C01B 2203/1064* (2013.01); *C01B 2203/107* (2013.01); *Y02E 60/364* (2013.01)
USPC .......................................... 429/416; 429/417

(58) Field of Classification Search
CPC ... H01M 8/0606; H01M 8/0662; H01M 8/22; H01M 8/222; Y02E 60/364; C01B 3/047; C01B 2203/06; C01B 2203/1041; C01B 2203/1052; C01B 2203/1064; C01B 2203/107; B01J 8/0221; B01J 8/0438; B01J 21/04; B01J 23/42; B01J 23/44; B01J 23/462; B01J 23/745; B01J 2208/00061; B01J 2208/025
See application file for complete search history.

(56) References Cited

U.S. PATENT DOCUMENTS

| | | | |
|---|---|---|---|
| 7,745,027 B2* | 6/2010 | Mohajeri et al. | 429/416 |
| 2002/0028171 A1 | 3/2002 | Goetsch et al. | |
| 2005/0022450 A1* | 2/2005 | Tan et al. | 48/198.3 |
| 2005/0172556 A1 | 8/2005 | Powell et al. | |
| 2005/0281735 A1* | 12/2005 | Chellappa et al. | 423/648.1 |
| 2009/0004100 A1* | 1/2009 | Umemoto et al. | 423/648.1 |

FOREIGN PATENT DOCUMENTS

| | | |
|---|---|---|
| GB | 1 353 751 | 5/1974 |
| JP | A-2003-40602 | 2/2003 |
| JP | A-2005-145748 | 6/2005 |
| WO | WO 2004/048260 A1 | 6/2004 |
| WO | WO 2006/126018 A1 | 11/2006 |

OTHER PUBLICATIONS

Liu, S. et al., "Oxidative Decomposition of Ammonia for $CO_x$-Free Hydrogen Production," *Prep. Pap.-Am. Chem,. Soc., Div. Pet. Chem.*, 2008, pp. 61-63, vol. 53, No. 1.

Yin, S.F. et al., "A mini-review on ammonia decomposition catalysts for on-site generation of hydrogen for fuel cell applications," *Applied Catalysts A: General*, 2004, pp. 1-9, Vol. 277.

García-García, F.R. et al., "High purity hydrogen production by low temperature catalytic ammonia decomposition in a multifunctional membrane reactor," *Catalysis Communications*, 2008, pp. 482-486, vol. 9.

International Search Report issued in International Application No. PCT/JP2010/054614 on Feb. 14, 2011.

* cited by examiner

*Primary Examiner* — Raymond Alejandro

(74) *Attorney, Agent, or Firm* — Oliff PLC

(57) ABSTRACT

A hydrogen generating apparatus for effectively generating hydrogen from ammonia and relates to the hydrogen generating apparatus for generating hydrogen from ammonia. The apparatus comprises an ammonia oxidation part having ammonia oxidation catalysts which oxidizes ammonia, and an ammonia decomposition part having an ammonia decomposition catalyst which decomposes ammonia to generate nitrogen and hydrogen. The decomposition part is located downstream of the oxidation part in a direction of feed gas flow. The oxidation catalyst contains both a noble metal catalyst and a base metal catalyst, and a loading concentration of the noble metal catalyst in an upstream portion of the oxidation part is higher than a loading concentration of the noble metal catalyst in a downstream portion of the oxidation part, and/or the decomposition catalyst contains both a noble metal catalyst and a base metal catalyst, and a loading concentration of the noble metal catalyst in a downstream portion of the decomposition part is higher than a loading concentration of the noble metal catalyst in an upstream portion of the decomposition part.

8 Claims, 5 Drawing Sheets

HYDROGEN GENERATING APPARATUS AND HYDROGEN GENERATING METHOD

TECHNICAL FIELD

The present invention relates to a hydrogen generating apparatus, and more specifically, a hydrogen generating apparatus suitable for an automobile. Further, the present invention relates to a hydrogen generating method using such a hydrogen generating apparatus.

BACKGROUND ART

Recently, it has been proposed to use hydrogen as a clean energy source. Particularly, automobiles powered by fuel cells using hydrogen as fuel are being actively developed. The exhaust gas from fuel cells using hydrogen as fuel does not contain nitrogen oxide, particulate matter (PM), carbon dioxide, etc., which are contained in the exhaust gas from an internal combustion engine, and therefore such fuel cells are suitable as a clean power source which can prevent environmental pollution and global warming.

However, since hydrogen occupies a large volume when stored, a means for feeding hydrogen as a fuel has been problematic, especially for fuel cells for automobiles.

In connection with this problem, as described in Patent Documents 1 and 2 below, a method for generating hydrogen by decomposing ammonia, etc., is attracting attention. For example, Patent Document 1 proposes a hydrogen generating apparatus for fuel cells having a decomposer, which decomposes at least one of ammonia and hydrazine as a hydrogen source into nitrogen and hydrogen by a catalytic reaction, and then supplies the obtained nitrogen and hydrogen to a fuel cell. In one embodiment of the hydrogen generating apparatus for fuel cells, unreacted ammonia and hydrogen in the exhaust gas from fuel cells are combusted by a catalytic reaction in a combustion assembly, and the exhaust gas heat from this combustion assembly is supplied to a decomposer which decomposes ammonia, etc. Patent Document 1 describes that, according to this embodiment, a heat source to heat a decomposer becomes unnecessary and therefore energy efficiency improves.

CITED PATENT DOCUMENTS

Patent Document 1: Japanese Unexamined Patent Publication No. 2003-40602
Patent Document 2: Japanese Unexamined Patent Publication No. 2005-145748

SUMMARY OF INVENTION

Technical Problem

The present invention provides a hydrogen generating apparatus and a hydrogen generating method, for effectively generating hydrogen from ammonia.

Solution to Problem

The inventors of the present invention have studied an apparatus and a method for generating hydrogen from ammonia, and conceived of the following present invention:

<1> A hydrogen generating apparatus for generating hydrogen from ammonia,
wherein the hydrogen generating apparatus comprises an ammonia oxidation part having an ammonia oxidation catalyst which oxidizes ammonia, and an ammonia decomposition part having an ammonia decomposition catalyst which decomposes ammonia to generate nitrogen and hydrogen;

wherein the ammonia decomposition part is located downstream of the ammonia oxidation part in a direction of feed gas flow; and wherein the hydrogen generating apparatus satisfies either or both of the following conditions (i) and (ii):

(i) the ammonia oxidation catalyst contains both a noble metal catalyst and a base metal catalyst, and a loading concentration of the noble metal catalyst in an upstream portion of the ammonia oxidation part in the direction of feed gas flow is higher than a loading concentration of the noble metal catalyst in a downstream portion of the ammonia oxidation part in the direction of feed gas flow, (ii) the ammonia decomposition catalyst contains both a noble metal catalyst and a base metal catalyst, and a loading concentration of the noble metal catalyst in a downstream portion of the ammonia decomposition part in the direction of feed gas flow is higher than a loading concentration of the noble metal catalyst in an upstream portion of the ammonia decomposition part in the direction of feed gas flow.

<2> The hydrogen generating apparatus according to the above <1>, satisfying both of the conditions (i) and (ii).

<3> A hydrogen generating method for generating hydrogen from ammonia with use of the hydrogen generating apparatus according to the above <1> or <2>, comprising:

supplying a feed gas containing ammonia and oxygen to the ammonia oxidation part, partially oxidizing the ammonia to obtain an ammonia-containing partially oxidized gas, supplying the ammonia-containing partially oxidized gas to the ammonia decomposition part, and decomposing ammonia into nitrogen and hydrogen to obtain a hydrogen-containing product gas, and controlling the reaction in the ammonia oxidation part and/or the ammonia decomposition part by adjusting the temperature of the feed gas and/or the ratio of ammonia and oxygen in the feed gas.

<4> The method according to the above <3>, wherein the temperature of the feed gas and/or the ratio of ammonia and oxygen in the feed gas is adjusted so that the temperature of the hydrogen-containing product gas discharged from the ammonia decomposition part is a prescribed temperature or higher.

<5> A fuel cell or internal combustion engine system provided with the hydrogen generating apparatus according to the above <1> or <2>, and a fuel cell or an internal combustion engine in which hydrogen is supplied by the hydrogen generating apparatus.

DESCRIPTION OF EMBODIMENTS

<<The First Embodiment of the Hydrogen Generating Apparatus of the Present Invention>>

Figure 1:
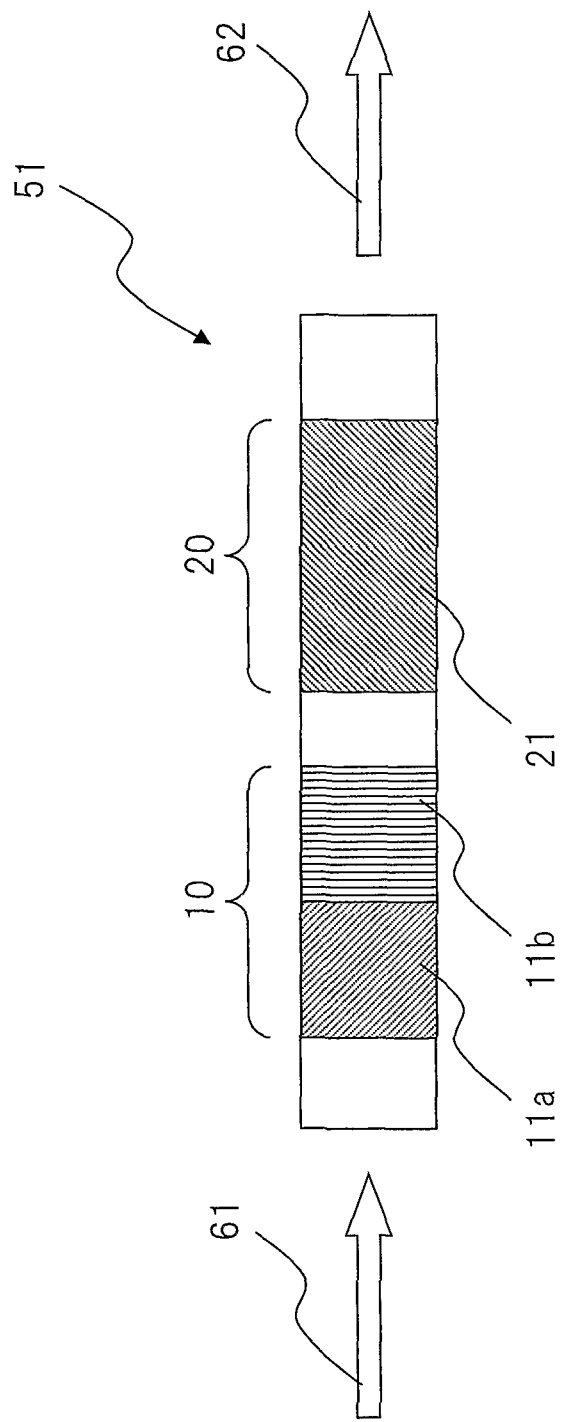
FIG. 1 is a drawing showing one embodiment of the hydrogen generating apparatus of the present invention.

The hydrogen generating apparatus of the present invention can be configured, for example, as shown in FIG. 1. The first embodiment (51) of the hydrogen generating apparatus of the present invention shown in FIG. 1 has an ammonia oxidation part (10) having ammonia oxidation catalysts (11a, 11b) which oxidize ammonia, and an ammonia decomposition part (20) having an ammonia decomposition catalyst (21) which decomposes ammonia to generate nitrogen and hydrogen. In the hydrogen generating apparatus (51), a feed gas containing ammonia and oxygen is supplied as indicated by arrow 61, a product gas containing hydrogen is obtained as indicated by arrow 62, and therefore the ammonia decomposition part (20) is located downstream of the ammonia oxidation part (10) in the direction of the feed gas flow.

The feed gas containing ammonia and oxygen may be a mixed gas of ammonia and air. Further, in FIG. 1, the ammonia oxidation part (10) and the ammonia decomposition part (20) are disposed in one container, but, as a matter of course, the ammonia oxidation part and ammonia decomposition part may be disposed in separate containers connected by a gas passage. The above also applies to the other embodiments.

According to the hydrogen generating apparatus of the present invention, in the ammonia oxidation part, a portion of the ammonia is oxidized by oxygen in the air (Formula 1 below) to generate the heat of oxidation, and in the ammonia decomposition part, and another portion of the ammonia is decomposed into hydrogen and nitrogen with use of the heat of oxidation (Formula 2 below), and thereby hydrogen is generated from ammonia with a simple configuration with a decrease in or no need of external heating.

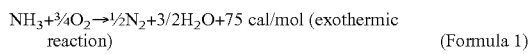

$$NH_3 + 3/4 O_2 \rightarrow 1/2 N_2 + 3/2 H_2O + 75 \text{ cal/mol (exothermic reaction)} \quad \text{(Formula 1)}$$

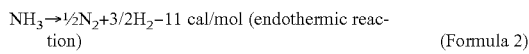

$$NH_3 \rightarrow 1/2 N_2 + 3/2 H_2 - 11 \text{ cal/mol (endothermic reaction)} \quad \text{(Formula 2)}$$

When an inexpensive base metal catalyst is used as the ammonia oxidation catalyst, a high temperature, such as more than 400° C. is generally required to cause the oxidation reaction of ammonia shown in the above Formula 1 at a substantial rate. When a noble metal catalyst such as platinum having high activity as an ammonia oxidation catalyst is used, the temperature required to cause the reaction at a substantial rate is lowered to between 150° C. and 200° C. or above, but the use of a large amount of a noble metal catalyst is not desirable in terms of cost.

In this connection, in the ammonia oxidation part (10) of the hydrogen generating apparatus of the present invention, an ammonia oxidation catalyst contains both a noble metal catalyst and a base metal catalyst, and the loading concentration of the noble metal catalyst in an upstream portion (11a) in the direction of feed gas flow is higher, for example two times or more, five times or more, or ten times or more higher, than the loading concentration of the noble metal catalyst in a downstream portion (11b) in the direction of feed gas flow. Regarding the present invention, "the loading concentration" of a catalyst means a ratio to a mass of a carrier, such as alumina powder.

According to the configuration, partial oxidation of ammonia is accelerated by a noble metal catalyst supported by a high concentration in the upstream portion of the ammonia oxidation part in the direction of the feed gas flow, and thereby the temperature of the feed gas passing through an ammonia oxidation part can be increased to, for example, above 500° C. by the reaction heat obtained from the partial oxidation. As a result, partial oxidation of ammonia can be accelerated even in the downstream portion of an ammonia oxidation part in which the loading concentration of a noble metal catalyst is relatively low.

Namely, according to the hydrogen generating apparatus of the present invention, the oxidation heat can be generated effectively by a partial oxidation reaction of ammonia with a reduced amount of a relatively expensive noble metal catalyst used in an ammonia oxidation part.

<<The Second Embodiment of the Hydrogen Generating Apparatus of the Present Invention>>

Figure 2:
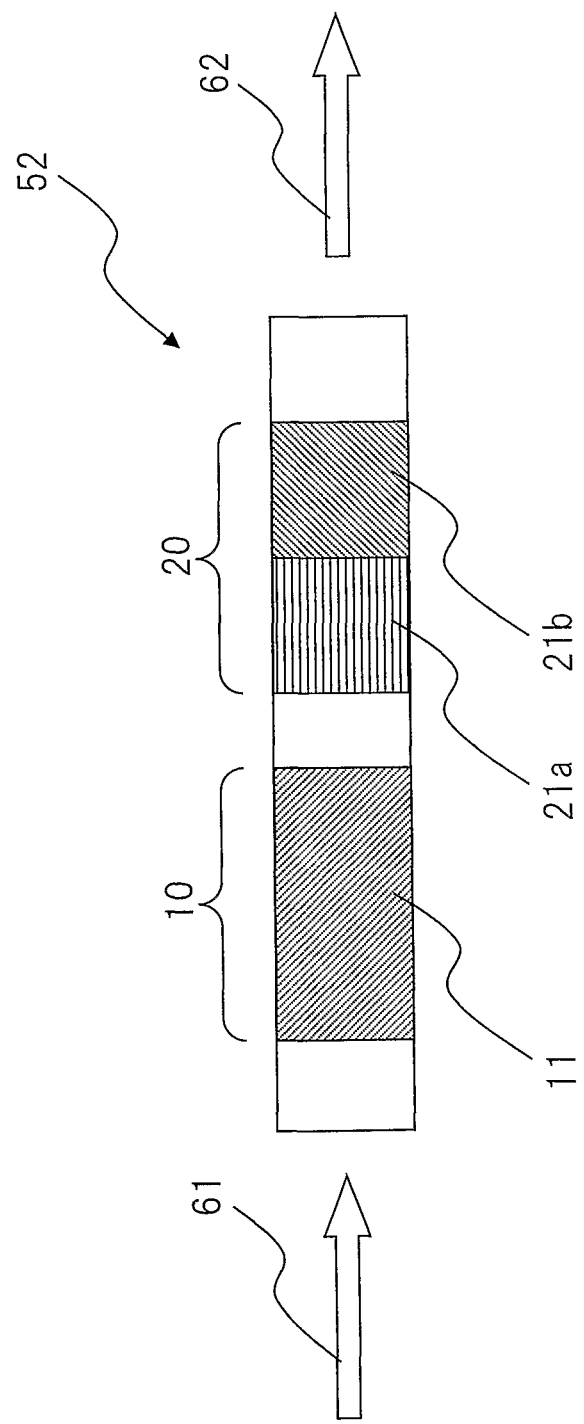
FIG. 2 is a drawing showing another embodiment of the hydrogen generating apparatus of the present invention.

Further, the hydrogen generating apparatus of the present invention can be configured, for example, as shown in FIG. 2. The second embodiment (52) of the hydrogen generating apparatus of the present invention shown in FIG. 2 has an ammonia oxidation part (10) having an ammonia oxidation catalyst (11) which oxidizes ammonia, and an ammonia decomposition part (20) having ammonia decomposition catalysts (21a, 21b) which decompose ammonia to generate nitrogen and hydrogen. In the hydrogen generating apparatus (52), and a feed gas containing ammonia and oxygen is supplied as indicated by arrow 61, a product gas containing hydrogen is obtained as indicated by arrow 62, and therefore the ammonia decomposition part (20) is located downstream of the ammonia oxidation part (10) in the direction of the feed gas flow.

According to the hydrogen generating apparatus of the present invention, in the ammonia oxidation part, a portion of the ammonia is oxidized by oxygen in the air (Formula 1 above) to generate the heat of oxidation, and in the ammonia decomposition part, and another portion of the ammonia is decomposed into hydrogen and nitrogen with use of the heat of oxidation (Formula 2 above). As a result, hydrogen is generated from ammonia with a simple configuration.

When an inexpensive base metal catalyst is used as an ammonia decomposition catalyst, a high temperature such as more than 500° C. is required to cause the decomposition reaction of ammonia shown in the above Formula 2 at a substantial rate. When a noble metal catalyst, such as ruthenium, which is an ammonia decomposition catalyst, is used, the temperature required to cause the reaction at a substantial rate is lowered to such as 350° C. or more, but the use of a large amount of a noble metal datalyst is not desirable in terms of cost. Because the decomposition reaction of ammonia shown in the above Formula 2 is an endothermic reaction, as the feed gas passes through the ammonia decomposition part and moves downstream in the direction of the feed gas, and at the same time, the decomposition reaction of ammonia proceeds, the temperature of the gas is lowered, and it becomes more difficult for the decomposition reaction to proceed.

In this connection, in the ammonia decomposition part (20) of the hydrogen generating apparatus of the present invention, an ammonia decomposition catalyst contains both a noble metal catalyst and a base metal catalyst, and the loading concentration of the, noble metal catalyst in a downstream portion (21b) in the direction of feed gas flow is higher, for example two times or more, five times or more, or ten times or more higher, than the loading concentration of the noble metal catalyst in an upstream portion (21a) in the direction of feed gas flow.

According to the configuration, in an upstream portion of the ammonia decomposition part in the direction of the feed gas flow in which the temperature of the feed gas is relatively high, the decomposition reaction (endothermic reaction) of ammonia is accelerated by a base metal catalyst, and in the downstream portion of the ammonia decomposition part in the direction of the feed gas flow in which it is difficult for the reaction to proceed because of the decreased temperature of the feed gas, the decomposition of ammonia can be accelerated by a noble metal catalyst supported in a high concentration in the downstream portion.

Namely, according to the hydrogen generating apparatus of the present invention, the decomposition reaction of ammonia can be accelerated effectively with a reduced amount of a relatively expensive noble metal catalyst used in the ammonia decomposition part.

<<The Third Embodiment of the Hydrogen Generating Apparatus of the Present Invention>>

Figure 3:
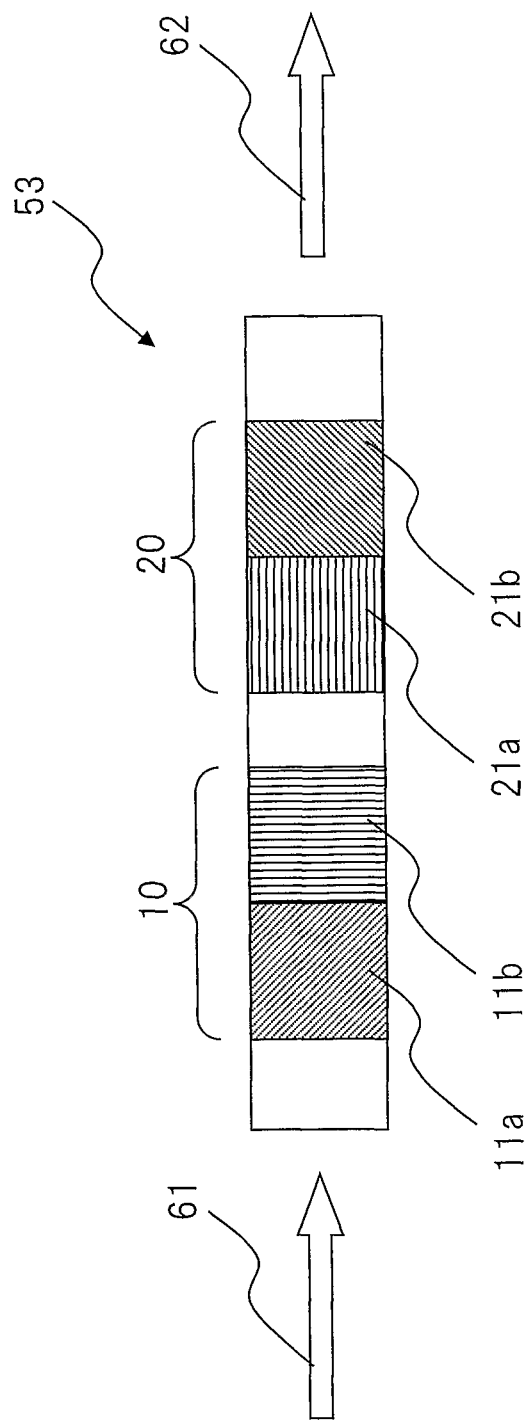
FIG. 3 is a drawing showing another embodiment of the hydrogen generating apparatus of the present invention.

Further, the hydrogen generating apparatus of the present invention can be configured, for example, as shown in FIG. 3. The third embodiment of the hydrogen generating apparatus (53) of the present invention shown in FIG. 3 has an ammonia oxidation part (10) having ammonia oxidation catalysts (11a, 11b) which oxidize ammonia, and an ammonia decomposition part (20) having ammonia decomposition catalysts (21a, 21b) which decompose ammonia to generate nitrogen and hydrogen. In the hydrogen generating apparatus (53), and a feed gas containing ammonia and oxygen is supplied as indicated by arrow 61, a product gas containing hydrogen is obtained as indicated by arrow 62, and therefore the ammonia decomposition part (20) is located downstream of the ammonia oxidation part (10) in the direction of the feed gas flow.

Figure 4:
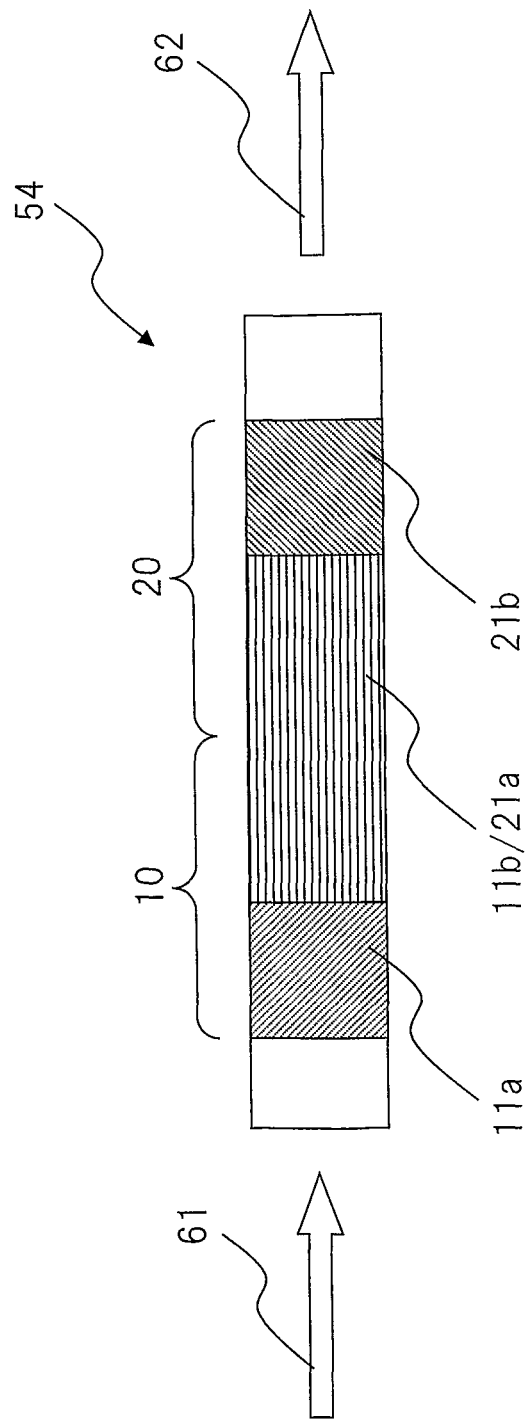
FIG. 4 is a drawing showing another embodiment of the hydrogen generating apparatus of the present invention.

Further, the downstream portion (11b) of the ammonia oxidation part (10) in a direction of feed gas flow may be separated from the upstream portion (21a) of the ammonia decomposition part (20) in the direction of the feed gas flow. However, as shown in FIG. 4, these portions may be configured as one body.

According to the hydrogen generating apparatus of the present invention, in the ammonia oxidation part, a portion of the ammonia is oxidized by oxygen in the air (Formula 1 above) to generate the heat of oxidation, and in the ammonia decomposition part, and another portion of the ammonia is decomposed into hydrogen and nitrogen with use of the heat of oxidation (Formula 2 above). As a result, hydrogen is generated from ammonia with a simple configuration.

According to the hydrogen generating apparatus of the present invention, the effect of the first and the second embodiments of the hydrogen generating apparatus of the present invention explained regarding FIG. 1 and FIG. 2, i.e. the effect that the oxidation reaction and the decomposition reaction of ammonia can be accelerated effectively with a reduced amount of a relatively expensive noble metal catalyst used in the ammonia oxidation part and the ammonia decomposition part, can be obtained.

<<The Hydrogen Generating Apparatus of the Present Invention—Ammonia Oxidation Catalyst>>

As the ammonia oxidation catalysts used in the hydrogen generating apparatus of the present invention, noble metal catalysts such as platinum, ruthenium, palladium, rhodium, etc., particularly platinum; and base metal catalysts, such as iron, cobalt, nickel, etc., particularly iron and can be listed.

<<The Hydrogen Generating Apparatus of the Present Invention—Ammonia Decomposition Catalyst>>

As the ammonia decomposition catalysts used in the hydrogen generating apparatus of the present invention, noble metal catalysts such as platinum, ruthenium, palladium, rhodium, etc., particularly ruthenium; and base metal catalysts such as iron, cobalt, nickel, tungsten, molybdenum, vanadium, etc., particularly nickel can be listed.

<<The Usage of the Hydrogen Generating Apparatus of the Present Invention>>

The hydrogen generating apparatus of the present invention can be used for any application, and for example, it can be used in combination with fuel cells or internal combustion engines, and particularly in combination with a fuel cell and an internal combustion engine for a moving vehicle, such as automobile. According to the hydrogen generating apparatus of the present invention, hydrogen can be generated from ammonia with a simple configuration, and further the oxidation reaction and/or the decomposition reaction of ammonia can be effectively accelerated with a reduced amount of a relatively expensive noble metal catalyst used in the ammonia oxidation part and/or the ammonia decomposition part. Therefore, for example, when the hydrogen generating apparatus of the present invention is provided in an automobile, the required amount of heat can be supplied by oxidizing ammonia, even if the amount of heat of the exhaust gas is not enough to be used as a heat source to provide a required temperature.

Further, the hydrogen generating apparatus of the present invention can be used for ammonia combustion engines using ammonia as a fuel, particularly for ammonia combustion engines for automobiles. When ammonia is used as a fuel in an engine, the combustion of ammonia may become insufficient at the time of low load operation and high load operation of engine because the ignition quality of ammonia is low. Therefore, in this case, it is necessary to add a combustion improver to assist in the combustion of ammonia. As the combustion improver, hydrocarbon compounds and hydrogen can be listed. When the hydrogen obtained by decomposing ammonia with use of the hydrogen generating apparatus of the present invention is used as a Combustion improver for ammonia combustion, it is preferable that only ammonia can be used as a precursor of a combustion improver and as a fuel. Further, optionally, the oxidation and the decomposition reaction of ammonia can be accelerated by supplying the heat energy of the exhaust gas from the engine to the ammonia oxidation part and decomposition part.

Figure 5:
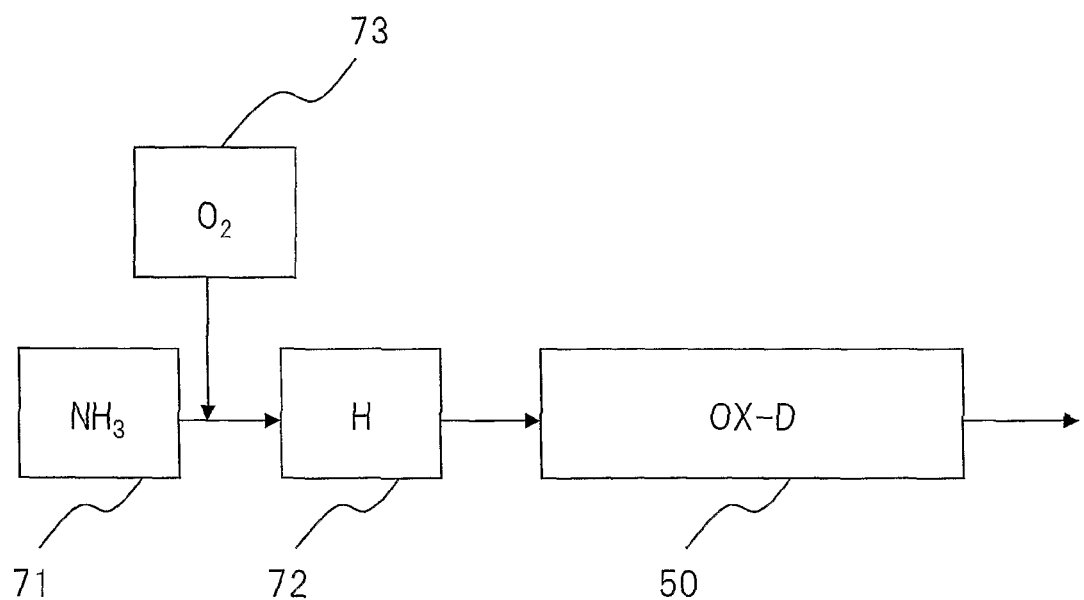
FIG. 5 is a drawing showing an embodiment for the use of the hydrogen generating apparatus of the present invention.

Specifically, in the hydrogen generating apparatus of the present invention, as shown in FIG. 5, an ammonia supply part 71, an optional heater 72, an oxygen supply part 73 may used in combination, and the ammonia and oxygen supplied from the ammonia supply part 71 and the oxygen supply part 73 may be optionally heated by the heater 72 and then supplied to the hydrogen generating apparatus 50 of the present invention.

In this case, the ammonia supply part may be any part which can supply ammonia to the hydrogen generating apparatus. Therefore, the ammonia supply part may be, for example, an ammonia tank, particularly, an ammonia tank containing ammonia in a liquid state. Further, in this case, it is preferable that the ammonia supply part optionally has a pump, a valve, etc., in order to control the amount of ammonia supplied.

Further, the oxygen supply part may be any part which can supply oxygen to the hydrogen generating apparatus, and particularly an air supply part supplying air to the ammonia oxidation part. Therefore, this oxygen supply part may be comprised of an air intake port for taking air from ambient atmosphere, a pump, a valve, etc.

The optional heater may be any heater which can heat ammonia and air respectively supplied from the ammonia supply part and the oxygen supply part.

<<The Hydrogen Generating Method of the Present Invention>>

In the method of the present invention generating hydrogen from ammonia with use of the hydrogen generating apparatus of the present invention, a hydrogen-containing product gas can be obtained by supplying a feed gas containing ammonia and oxygen to the ammonia oxidation part, partially oxidizing ammonia to obtain an ammonia-containing partially oxidized gas, supplying the ammonia-containing partially oxidized gas obtained in this manner to the ammonia decomposition part, and decomposing ammonia into nitrogen and hydrogen. Further, in this case, the reaction in the ammonia oxidation part and/or ammonia decomposition part can be controlled by adjusting the temperature of the feed gas and/or the ratio of ammonia and oxygen in the feed gas.

For example, the ammonia oxidation reaction (exothermic reaction) in the ammonia oxidation part can be accelerated by increasing the temperature of the feed gas supplied to the ammonia oxidation part by a heater. Further, for example, the generation of heat by the ammonia oxidation reaction can be accelerated by increasing the ratio of oxygen supplied to the ammonia oxidation part to increase the ratio of ammonia oxidized in the ammonia oxidation part, or the ratio of ammonia used for hydrogen generation can be increased by decreasing the ratio of oxygen supplied to the ammonia oxidation part to decrease the ratio of ammonia oxidized in the ammonia oxidation part.

For example, the ammonia decomposition reaction in the ammonia decomposition part can be accelerated sufficiently by adjusting the temperature of the feed gas and/or the ratio of ammonia and oxygen in the feed gas so that a hydrogen-containing product gas obtained from the ammonia decomposition part has a predetermined temperature or more. The "predetermined temperature" is for example, the temperature that the decomposition of ammonia in the ammonia decomposition part sufficiently proceeds under the presence of noble metal catalysts, and for example the temperature can be from 300° C. to 500° C.

A thermometer such as a thermocouple can be optionally located at the inlet side and/or the outlet side of the ammonia oxidation part, and/or at the inlet side and/or the outlet side of the ammonia decomposition part in order to control the hydrogen generating apparatus of the present invention in a method of the present invention.

EXAMPLE

A hydrogen-containing product gas was obtained from ammonia and air by the hydrogen generating apparatus having the configuration shown in FIGS. 1 to 3. The ammonia oxidation part and the ammonia decomposition part were composed as shown in Table 1 below.

TABLE 1

| | Composition of hydrogen generating apparatus | | | |
|---|---|---|---|---|
| | Ammonia oxidation part | | Ammonia decomposition part | |
| | Upstream catalyst | Downstream catalyst | Upstream catalyst | Downstream catalyst |
| Reference example | Platinum catalyst (12 ml) | | Ruthenium catalyst (24 ml) | |
| Example 1 | Platinum catalyst (4 ml) | Iron catalyst (15 ml) | Ruthenium catalyst (24 ml) | |
| Example 2 | Platinum catalyst (4 ml) | Iron catalyst (15 ml) | Nickel catalyst (8 ml) | Ruthenium catalyst (12 ml) |
| Comparative example 1 | (None) | | Ruthenium catalyst (240 ml) | |
| Comparative example 2 | (None) | | Ruthenium catalyst (240 ml) (externally heated) | |

Platinum catalyst: a noble metal catalyst for oxidation, specifically a catalyst in which a platinum-supporting alumina powder was coated on a honeycomb structure made of cordierite (2 g of platinum/L-substrate).

Iron catalyst: a base metal catalyst for oxidation, specifically a catalyst in which 5 mass% of iron oxide is supported on a pellet-shaped alumina powder having a diameter of 1 mm.

Nickel catalyst: a base metal catalyst for decomposition, specifically a catalyst in which 10 mass % of nickel is supported on alumina powder formed in a pellet-shaped alumina powder having a diameter of 1 mm.

Ruthenium catalyst: a noble metal catalyst for decomposition, specifically a catalyst in which 5 mass % of ruthenium is supported on a pellet-shaped alumina powder having a diameter of 1 mm.

In evaluation, the outlet temperature of the ammonia oxidation part and the ammonia decomposition part, as well as the hydrogen content of the ammonia decomposition part were measured at a constant ammonia supply rate of 100 NL (standard liter)/min and various temperatures of the feed gas to the ammonia oxidation part and various amounts of feed air. In the reference example and examples, the amount of feed air was set so that the outlet temperature of the oxidation part (substantially equal to the temperature of the inlet of the decomposition part) was 400° C. Further, Comparative example 2 is the same as Comparative example 1, except that the ammonia decomposition part was externally heated with a heater. A heater was used to keep the temperature of the feed gas constant.

The conditions of evaluation and, results are shown in Table 2, below. Further, in Table 2, a hydrogen yield was obtained from the following formula:

<Hydrogen yield (%)>=<The amount of hydrogen produced (NL)>/<The amount of ammonia supplied (NL)×1.5>×100

TABLE 2

Conditions of evaluation and results

| | Supplied amount (NL/min) | | | Temperature (°C.) | | | |
| --- | --- | --- | --- | --- | --- | --- | --- |
| | Air | Ammonia | Air/Ammonia | Feed gas temperature | Outlet temperature of oxidation part (or Inlet temperature of decomposition part) | Outlet temperature of decomposition part | Hydrogen yield (%) |
| Reference example | 84.0 | 100 | 0.840 | 200 | 868 | 400 | 82.4 |
| Example 1 | 67.6 | 100 | 0.676 | 400 | 899 | 400 | 85.5 |
| Example 2 | 51.4 | 100 | 0.514 | 600 | 931 | 400 | 89.2 |
| Comparative example 1 | 0 | 100 | 0 | 200 | | 200 | 0 |
| | 0 | 100 | 0 | 400 | | 350 | 4.5 |
| | 0 | 100 | 0 | 600 | | 350 | 48.4 |
| Comparative example 2 | 0 | 100 | 0 | | 200* | | 0 |
| | 0 | 100 | 0 | | 400* | | 99.1 |
| | 0 | 100 | 0 | | 600* | | 100 |

*Ammonia decomposition part was externally heated.

As shown in the above Table 2, although the hydrogen generating apparatuses of the examples used noble metal catalysts (platinum catalyst and ruthenium catalyst) in smaller amounts than that of the Reference example, the hydrogen generating apparatuses of the examples achieve hydrogen yields similar to or more than that of the Reference example (yields close to the theoretical yield).

Further, the hydrogen generating apparatuses of the examples achieved excellent hydrogen yields even in comparison with that of Comparative example 1 which does not use oxidation of ammonia, but instead, uses ruthenium as an ammonia decomposition catalyst in the amount of ten times higher than that of the examples.

Further, the hydrogen generating apparatuses of the examples were excellent in that they do not require external heat like the hydrogen generating apparatus of Comparative example 2, although the hydrogen yields of the examples were inferior in comparison with that of Comparative example 2 which does not use oxidation of ammonia, but instead, uses ruthenium as an ammonia decomposition catalyst in the amount of ten times higher than that of the examples and the external heat in the ammonia decomposition part.

Reference Signs List
10: Ammonia oxidation part
11, 11a, 11b: Ammonia oxidation catalyst
20: Ammonia decomposition part
21, 21a, 21b: Ammonia decomposition catalyst
50, 51, 52, 53: Hydrogen generators of the present invention
61: Arrow indicating a feed gas flow
62: Arrow indicating a product gas flow
71: Ammonia supply part
72: Heater
73: Air supply part

The invention claimed is:

1. A hydrogen generating apparatus for generating hydrogen from ammonia,
wherein the hydrogen generating apparatus comprises an ammonia oxidation part having an ammonia oxidation catalyst which oxidizes ammonia, and an ammonia decomposition part having an ammonia decomposition catalyst which decomposes ammonia to generate nitrogen and hydrogen;
wherein the ammonia decomposition part is located downstream of the ammonia oxidation part in a direction of feed gas flow; and
wherein the hydrogen generating apparatus satisfies either or both of the following conditions (i) and (ii):
(i) the ammonia oxidation catalyst contains both a noble metal catalyst and a base metal catalyst, and a loading concentration of the noble metal catalyst in an upstream portion of the ammonia oxidation part in the direction of feed gas flow is higher than a loading concentration of the noble metal catalyst in a downstream portion of the ammonia oxidation part in the direction of feed gas flow,
(ii) the ammonia decomposition catalyst contains both a noble metal catalyst and a base metal catalyst, and a loading concentration of the noble metal catalyst in a downstream portion of the ammonia decomposition part in the direction of feed gas flow is higher than a loading concentration of the noble metal catalyst in an upstream portion of the ammonia decomposition part in the direction of feed gas flow.

2. The hydrogen generating apparatus according to claim 1, satisfying both of the conditions (i) and (ii).

3. A hydrogen generating method for generating hydrogen from ammonia with use of the hydrogen generating apparatus according to claim 1, comprising:
supplying a feed gas containing ammonia and oxygen to the ammonia oxidation part, partially oxidizing the ammonia to obtain an ammonia-containing partially oxidized gas, supplying the ammonia-containing partially oxidized gas to the ammonia decomposition part, and decomposing ammonia into nitrogen and hydrogen to obtain a hydrogen-containing product gas, and
controlling the reaction in the ammonia oxidation part and/or the ammonia decomposition part by adjusting the temperature of the feed gas and/or the ratio of ammonia and oxygen in the feed gas.

4. The method according to claim 3, wherein the temperature of the feed gas and/or the ratio of ammonia and oxygen in the feed gas is adjusted so that the temperature of the hydrogen-containing product gas discharged from the ammonia decomposition part is a prescribed temperature or higher.

5. A fuel cell or internal combustion engine system provided with the hydrogen generating apparatus according to claim 1, and a fuel cell or an internal combustion engine in which hydrogen is supplied by the hydrogen generating apparatus.

6. A hydrogen generating method for generating hydrogen from ammonia with use of the hydrogen generating apparatus according to claim 2, comprising:

supplying a feed gas containing ammonia and oxygen to the ammonia oxidation part, partially oxidizing the ammonia to obtain an ammonia-containing partially oxidized gas, supplying the ammonia-containing partially oxidized gas to the ammonia decomposition part, and decomposing ammonia into nitrogen and hydrogen to obtain a hydrogen-containing product gas, and controlling the reaction in the ammonia oxidation part and/or the ammonia decomposition part by adjusting the temperature of the feed gas and/or the ratio of ammonia and oxygen in the feed gas.

7. The method according to claim 6, wherein the temperature of the feed gas and/or the ratio of ammonia and oxygen in the feed gas is adjusted so that the temperature of the hydrogen-containing product gas discharged from the ammonia decomposition part is a prescribed temperature or higher.

8. A fuel cell or internal combustion engine system provided with the hydrogen generating apparatus according to claim 2, and a fuel cell or an internal combustion engine in which hydrogen is supplied by the hydrogen generating apparatus.

\* \* \* \* \*